(12) United States Patent
Krikke et al.

(10) Patent No.: US 9,965,226 B2
(45) Date of Patent: May 8, 2018

(54) METHOD FOR A PRINT FLEET SYSTEM

(71) Applicant: Océ-Technologies B.V., Venlo (NL)

(72) Inventors: Nanne Krikke, Venlo (NL); Vijay A. Kalloe, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days. days.

(21) Appl. No.: 15/380,761

(22) Filed: Dec. 15, 2016

(65) Prior Publication Data
US 2017/0097796 A1   Apr. 6, 2017

Related U.S. Application Data

(63) Continuation of application No. PCT/EP2015/063294, filed on Jun. 15, 2015.

(30) Foreign Application Priority Data

Jun. 16, 2014  (EP) .................................. 14172629

(51) Int. Cl.
*G06F 3/12* (2006.01)
*H04N 1/32* (2006.01)

(52) U.S. Cl.
CPC .......... *G06F 3/1208* (2013.01); *G06F 3/1207* (2013.01); *G06F 3/1219* (2013.01); *G06F 3/1227* (2013.01); *G06F 3/1232* (2013.01); *G06F 3/1241* (2013.01); *G06F 3/1256* (2013.01); *G06F 3/1268* (2013.01); *G06F 3/1285* (2013.01); *G06F 3/1288* (2013.01); *H04N 1/32122* (2013.01); *H04N 1/32523* (2013.01); *H04N 2201/3273* (2013.01)

(58) Field of Classification Search
None
See application file for complete search history.

(56) References Cited

U.S. PATENT DOCUMENTS

| 2012/0127525 | A1 | 5/2012 | Uchibori et al. |
| 2012/0127527 | A1* | 5/2012 | Nakabayashi ........ G06F 3/1204 358/1.15 |

(Continued)

FOREIGN PATENT DOCUMENTS

| GB | 2 387 004 A | 10/2003 |
| JP | 2008-72318 A | 3/2008 |

*Primary Examiner* — Helen Zong
(74) *Attorney, Agent, or Firm* — Birch, Stewart, Kolasch & Birch, LLP (57) ABSTRACT

A print fleet system includes a plurality of printer instances, which have a same set of at least one system setting. A registration system registers print jobs in combination with system settings of the same set of at least one system setting. An advice system generates advice for an operator. The registration system includes a value change made to the set of at least one system setting of a printer instance before printing a print job on the print engine. The advice system is configured to generate advice related to the same print job intended to be printed on another printer instance, the advice concerning the change includes in the registration system. The advice system is configured to transmit signals representing the advice to a user interface screen in order to advise the operator before printing the same print job on the other printer instance.

12 Claims, 6 Drawing Sheets

(56) References Cited

U.S. PATENT DOCUMENTS

| | | | |
|---|---|---|---|
| 2013/0208312 A1* | 8/2013 | Morita | G06F 3/04883 |
| | | | 358/1.15 |
| 2015/0029558 A1* | 1/2015 | Koike | G06K 15/1894 |
| | | | 358/3.24 |
| 2015/0248263 A1* | 9/2015 | Hattori | G06F 3/1204 |
| | | | 358/1.15 |

* cited by examiner

Fig. 1

| Printer | Date -Time | Action | Media used | System setting changed | New value |
|---|---|---|---|---|---|
| 121 | 01.04.2014 – 11:00:00 | JOB1 | MEDIA1 | | |
| 121 | 01.04.2014 – 12:30:00 | JOB2 | MEDIA2 | | |
| 121 | 01.04.2014 – 12:50:00 | CHANGE1 | | STV2 | 0.1 |
| 121 | 02.04.2014 – 10:00:10 | JOB1 | MEDIA1 | | |
| 121 | 02.04.2014 – 14:00:00 | JOB3 | MEDIA3 | | |
| 122 | 01.04.2014 – 11:30:00 | CHANGE2 | | TRP1 | 2.1 |
| 122 | 01.04.2014 – 12:00:00 | JOB2 | MEDIA2 | | |
| 122 | 01.04.2014 – 15:00:00 | JOB3 | MEDIA3 | | |
| 122 | 02.04.2014 – 11:00:00 | JOB1 | MEDIA1 | | |
| 122 | 02.04.2014 – 12:10:30 | JOB5 | MEDIA4 | | |
| 14 | 01.04.2014 – 11:00:00 | JOB5 | MEDIA1 | | |
| 14 | 02.04.2014 – 13:00:00 | JOB1 | MEDIA5 | | |
| 14 | 03.04.2014 – 15:00:00 | JOB5 | MEDIA2 | | |
| 14 | 03.04.2014 – 16:00:00 | JOB2 | MEDIA2 | | |

Fig. 2

| Printer | Date -Time | Action | Media used | System setting changed | New value |
|---|---|---|---|---|---|
| 121 | 04.04.2014 – 11:00:00 | JOB1 | MEDIA1 | | |
| 121 | 04.04.2014 – 12:30:00 | JOB2 | MEDIA2 | | |
| 121 | 04.04.2014 – 12:50:00 | CHANGE3 | | MSS1 | 0.1 |
| 121 | 04.04.2014 – 13:00:10 | JOB1 | MEDIA1 | | |
| 121 | 05.04.2014 – 14:00:00 | JOB3 | MEDIA3 | | |
| 122 | 04.04.2014 – 11:30:00 | JOB4 | MEDIA2 | | |
| 122 | 04.04.2014 – 12:00:00 | JOB2 | MEDIA2 | | |
| 122 | 04.04.2014 – 15:00:00 | JOB3 | MEDIA3 | | |
| 122 | 05.04.2014 – 11:00:00 | JOB1 | MEDIA1 | | |
| 122 | 05.04.2014 – 12:10:30 | JOB5 | MEDIA4 | | |
| 14 | 04.04.2014 – 13:00:00 | JOB5 | MEDIA1 | | |
| 14 | 05.04.2014 – 14:00:00 | JOB1 | MEDIA5 | | |
| 14 | 06.04.2014 – 15:00:00 | JOB5 | MEDIA2 | | |
| 14 | 06.04.2014 – 16:00:00 | JOB2 | MEDIA2 | | |

METHOD FOR A PRINT FLEET SYSTEM

CROSS-REFERENCE TO RELATED APPLICATIONS

This application is a continuation of PCT International Application No. PCT/EP2015/063294, filed on Jun. 15, 2015. PCT/EP2015/063294 claims priority under 35 U.S.C. § 119(a) to Application No. 14172629.9, filed in Europe on Jun. 16, 2014. The entire contents of each of the above-identified applications is hereby incorporated by reference into the present application.

BACKGROUND OF THE INVENTION

1. Field of the Invention

The invention relates to a print fleet system comprising a plurality of printer instances, each of the plurality of printer instances having a same set of at least one system setting; a registration system configured to register print jobs in combination with system settings of the same set of at least one system setting of the plurality of printer instances; an advice system configured to generate advice for an operator; and a user interface system for displaying the advice. The invention also relates to a method to be applied in a print fleet system according to the invention.

2. Description of Background Art

A print fleet system comprises a plurality of printers, each printer of the plurality of printers comprising a print engine. The print fleet system may comprise a plurality of printer instances, which have a same set of at least one system setting. A system setting is a setting, which configures the printer instance or influences the over-all behavior of the printer instance. A system setting may be a system configuration setting, which configures the printer instance. A system setting may be a system timing setting for regulating the behavior in time of the printer instance. A print job setting, like a number of copies, single/double sided printing, or n-up printing, which print job setting may be entered by a user when submitting a print job, is not meant to be a system setting according to this invention.

The print fleet system may comprise printer instances, which have the same set of system settings to be set, tuned or tweaked. System settings of a printer instance may be configured during installation of the printer instance. System settings of a printer instance may also be changed during uptime of the printer instance, for example before a print job is processed by the printer instance. The terms printer and printer instance are equivalent terms hereinafter.

A printer of the print fleet system usually has a local user interface comprising a screen suitable for display of information for the operator or user and suitable for operator input or user input. Hereinafter the term user will also be used for an operator of the print fleet system. The registration system and the advice system may be implemented as software components in a control unit in one of the printer instances or as software components in a work station connected to the plurality of printer instances of the print fleet system. A printer instance in a print fleet system may have system settings that are printer instance specific. For example, color calibration data and media registration settings may be different for each printer instance, even for the same media. Those system settings may be changed in order to optimize quality of output of the printer instance. As values of those system settings themselves are printer instance specific and, for example, dependent on wear and tear, these values cannot simply be copied to another printer instance to reproduce the same print quality.

SUMMARY OF THE INVENTION

It is an objective of the invention to provide a print fleet system that prevents a user from producing inconsistent or bad output due to production on different printer instances.

For this purpose, the registration system comprised in the print fleet system according to the invention comprises an entry for each value change made to the set of at least one system setting of a printer instance out of the plurality of printer instances, the advice system is configured to generate advice on another printer instance out of the plurality of printer instances, the advice concerning the value change comprised in the registration system, and the advice system is configured to transmit signals representing the advice to the user interface screen for display in order to advise the operator.

A value change made to a system setting of the set of common system settings for a particular printer instance of the plurality of printer instances in the print fleet system may be of interest for another printer instance of the plurality of printer instances. For example, the introduction of a new finishing module in the printer instance, or the use of a new print medium may introduce a value change of a system setting. The operator at the other printer instance sees at a glance that a system setting value change has been introduced in the print fleet system. The user interface system may be part of a local user interface belonging to the other printer instance.

According to an embodiment, the entry in the registration system also comprises a first print job intended to be printed on the printer instance on behalf of which first job a value change has been made, the advice system is configured to generate advice related to a second print job intended to be printed on another printer instance out of the plurality of printer instances, the advice concerning the value change comprised in the registration system, the value change being relevant for printing of the second print job, and the advice system is configured to transmit signals representing the advice to the user interface screen for display in order to advise the operator before printing the second print job on the other printer instance. The user interface system may be part of a local user interface belonging to the other printer instance.

Print jobs may be submitted by means of a printer driver to one of the printer instances of the print fleet system. A print job may also be sent to more than one printer of the print fleet system, for example for load balancing, due to documents that are periodically issued or due to availability of a printer of the print fleet system.

For a result of a print job, the values the system settings of the printer instance have been set to is relevant. When a result of a print job on a printer instance is not satisfactory, a user may change at least one system setting of the printer instance in order to get a better result of the print job on the same printer instance.

According to the invention, the print fleet system keeps in memory that a user has changed values of (a) certain system setting(s) for the first print job on the printer instance before printing of the first print job. When a user subsequently wants to print the second print job on another printer instance, for example on the same media, the user is prompted about the fact that it was necessary to optimize certain system settings before the output was satisfactory on a different printer instance. The value change made on behalf of the first print job may be relevant for printing of the second print job, if print job settings of the first print job and the second print job are the same, for example the first print job uses the same media to print upon as the second print job. The print fleet system forecasts and advises the user, for example on his preferred output result by certain job and media types combinations. The advice is based on earlier user choices on system settings by similar print job types and media type combinations on another printer instance. By following the advice, there is less waste of media, especially when a user prints multiple proofs for high quality print jobs before they start production. The invention is in particular advantageous for printer instances constructed of a same machine type, i.e. the same hardware modules of the printer instances, such as the print engines, the control units and/or the paper paths, are the same and essential software modules of the printer instances are the same. In most cases, printer instances of the same machine type have the same system settings that can be set by a user or operator.

According to an embodiment, the registration system is part of a catalog system of media and print jobs, which catalog system is shared among the plurality of printer instances in the print fleet system. Value changes of printer instance system settings are stored in the shared catalog such that other printer instances are able to detect whether another printer instance has modified the system settings for itself. The catalog system may reside on a separate computer system in the print fleet system or on a control unit of one of the printers of the print fleet system.

According to an embodiment, the user interface system is part of a printer driver system for the print fleet system, and the advice system is configured to transmit the signals representing the advice when the user selects the other printer instance on the printer driver system for printing the second print job. In this embodiment, the advice is generated and displayed before the second print job is submitted to the printer instance.

According to an embodiment, the media to be used for the first print job is equal to the media to be used for the second print job. A media can impose advisory or necessary value changes to system settings of the printer instance.

According to an embodiment, the second print job equals the first print job. In this case, the print job settings are the same and a prior value change to system settings for the first print job is advisable to be made for the second print job.

The invention also relates to a method for generating advice for a printer instance out of a plurality of printer instances having a same set of at least one system setting, the method comprising the steps of: receiving a value change of a system setting of a printer instance of the plurality of printer instances by a registration system, the system setting comprised in the set of at least one system setting; generating advice based on the received value change; and displaying the advice on a user interface screen of another printer instance of the plurality of printer instances.

According to an embodiment, the method further comprises the steps of: registering a first print job by the registration system of behalf of which first print job the value change has been made to the printer instance; upon printing a second print job on another printer instance, for which second print job the value change is relevant, retrieving the value change of at least one system setting out of the set from the registration system; generating the advice based on the value change relevant for printing the second print job; and displaying the advice on a user interface screen of the printer instance before printing the second print job on the other printer instance.

According to an embodiment, the method further comprises the steps of: submitting the second print job by means of a printer driver system; receiving a selection of the printer instance by means of a printer driver system; and upon the receipt of the selection performing the steps of retrieving the value change, generating the advice based on the value change, and displaying the advice.

According to an embodiment of the method, media to be used for the first print job is equal to media to be used for the second print job.

According to an embodiment of the method, the second print job equals the first print job.

According to an embodiment, the method comprises the steps of receiving a confirmation of the advice; and changing the at least one system setting on the other printer instance. The confirmation may be received by user input, for example an activation of a confirm button on the user interface screen.

According to a further embodiment, the method comprises the steps of: receiving a confirmation of the advice; and changing the at least one system setting on the printer instance before printing the second print job by the other printer instance.

The invention also relates to a non-transitory computer readable medium comprising computer executable program code configured to instruct a computer to perform the method according to the invention.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described with reference to the accompanying drawings, wherein the same reference numerals have been used to identify the same or similar elements throughout the several views.

Figure 1:
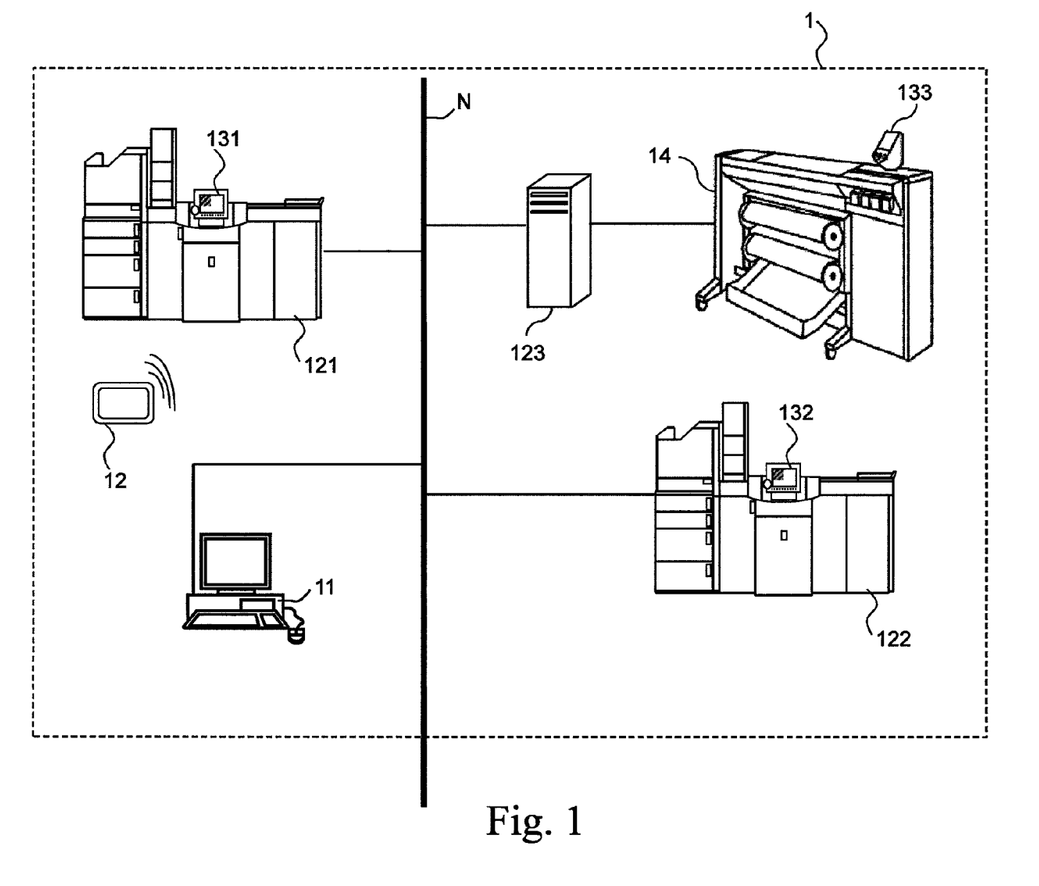
FIG. 1 illustrates the general arrangement of the print fleet system comprising the plurality of printers according to the invention.

FIG. 1 shows a general arrangement of a print fleet system 1 according to the invention. This print fleet system 1 comprises a plurality of printers 121, 122, 14 connected to a network N. The printer 14 is connected to the network N via a server 123. The server 123 may act as a control unit for the printer 14. A work station 11 may also be connected to the network N. The work station 11 may act as a control unit for any of the printers 121, 122, 14 of the print fleet system 1. A mobile device 12 may be wirelessly connected to the network N. The screen of the mobile device 12 may act as a user interface screen of the print fleet system 1. Printer 121 is provided with local user interface screen LUI 131. The printer 122 is provided with a local user interface screen LUI 132. Printer 14 is provided with a local user interface screen 133. The local user interface screens LUI 131, 132, 133 may act as a user interface screen for the method according to the invention. A control unit of one of the printers 121, 122, 14 may act as a central and data gathering control unit on which the registration system and the advice system according to the invention resides. However, a computer system on which the registration system and the advice system according to the invention resides separate from the printers 121, 122, 14, but connected to the network N, like the work station 11, may be envisioned. Such a computer system may also reside in a remote cloud system. Print jobs may be submitted to any one of the printers 121, 122, 14 by means of a printer driver. The printer driver may be installed on a work station of the user, like work station 11. A submitted print job arrives in a print job queue in storage of one of the control units of the printers 121, 122, 14. A print job submitted to one of the printers 121, 122, 14 is stored by the registration system with all its print job settings like media settings. A value change to a system setting of one of the printers 121, 122, 14 is also stored by the registration system. A moment in time of a value change of a system setting is stored. Additionally, in a further embodiment, a scheduled moment in time of producing a print job at the printer 121, 122, 14 is stored such that it is known which values the system settings have when the print job is produced. The advice generated by the advice system is sent to the appropriate user interface screen, such as the LUI 131, the LUI 132, the LUI 133 or to the work station 11. A work station on which the printer driver is active may use a pop up screen to show to the user the advice generated according to the invention. In the latter case, the advice may be shown in the pop up screen before the relevant print job is sent to the print engine. Instead of a pop up screen, the advice may appear in a user interface window of the printer driver.

The data gathering control unit receives the print jobs from each printer in the print fleet system 1. The data gathering control unit is also configured to control the display of the generated advices of the print fleet system 1 on a user interface screen like the LUI's 131, 132, 133 or on the screen of the work station 11 or on the screen of the mobile device 12.

The printers 121 and 122 have the same printer instances, i.e. electro-graphical printing systems of the same machine type, while the printer 14 is an inkjet printing system. System settings of the printers 121 and 122 may be the same.

However, values of the system settings of the printer 121 may differ from values of the system settings of the printer 122. A plurality of the same inkjet printer instances may also be envisioned to be part of the print fleet system according to the invention.

Figure 2:
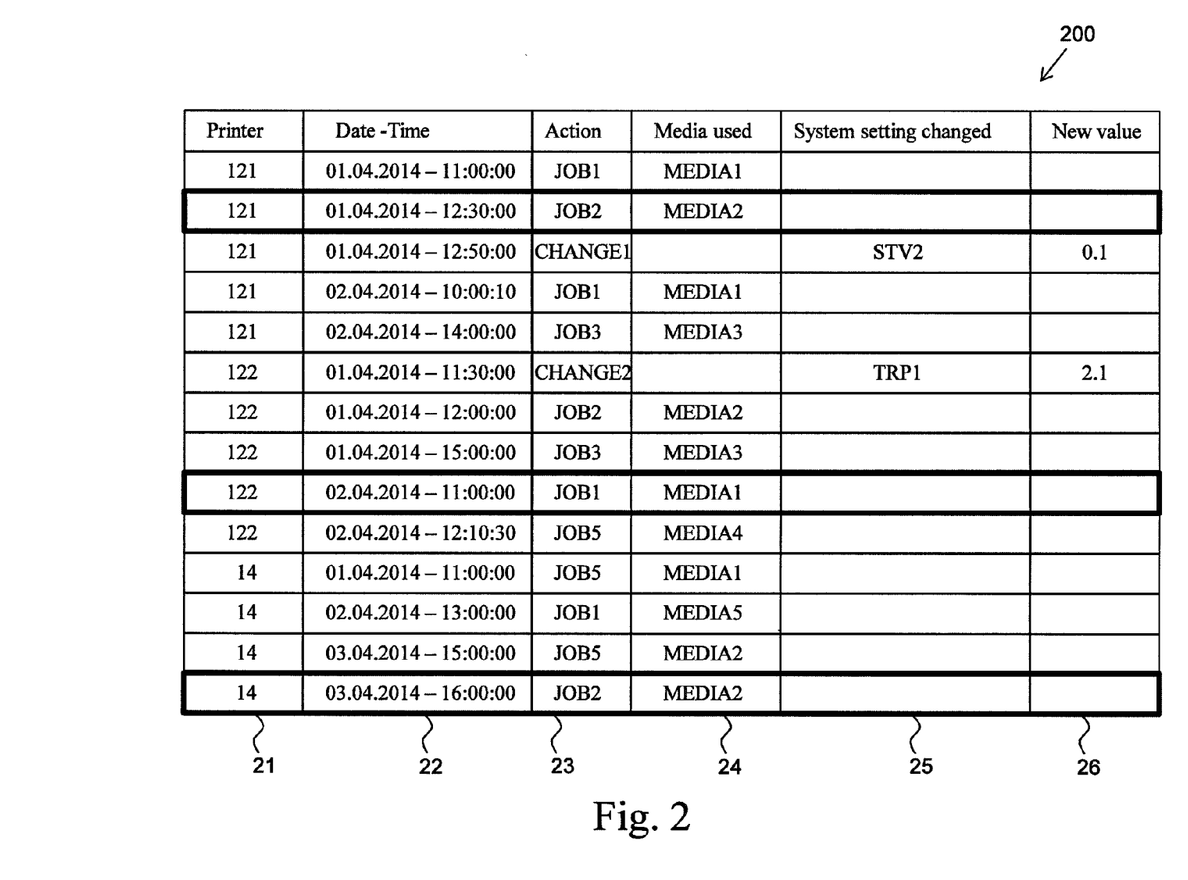
FIGS. 2-3 illustrate storage contents of print jobs and value changes to system settings of printer instances of the print fleet system according to the invention.

FIG. 2 schematically shows a storage content 200 of the registration system according to the invention. The storage content 200 comprises a number of columns 21-26 and rows of data records. In the first column 21, the appropriate printer number is registered. In the second column 22, the date and time of an action is registered. In the third column 23, the kind of action, a job submission or a value change of a system setting, is registered. A print job may be identified by a unique job name, a unique internal job number or by a combination of print job settings. In the fourth column 24, a media type for the submitted print job is registered. In the fifth column 25, a system setting which has been changed is registered. In the sixth column 26, a new value of the changed system setting is registered. In a less complex embodiment, only the value changes of the system settings for each printer instance of the print fleet system and the moments in time of the value changes are registered in the registration system. In the example hereinafter, print jobs are registered and value changes to two kinds of system settings take place.

A first change CHANGE1 is applied on printer 121 on date-time 01.04.2014-12:50:00 with respect to a system setting STV2, which is a secondary transfer voltage. The secondary transfer voltage is a voltage that may be used in transferring toner from a belt to a media. The second transfer voltage can be adjusted per media for optimal print quality for, e.g. rough or embossed paper. The secondary transfer voltage may depend on the printer instance and on the kind of media. A decrease of the secondary transfer voltage may be recommended for light (thin) paper, when tiny white spots appear on a low density area, although the density of high density areas is normal, when white spots appear on the high density areas, or when the paper surface is rough, such as for embossed paper, and white spots appear on the concave side of the paper. An increase of the secondary transfer voltage may be recommended for heavy (thick) paper, when a density level in both high and low density areas is low, when uneven gloss occurs in the high density images, or when an outline of high density images blurs.

In this example, a value of the secondary transfer voltage is changed into 0.1 V. In a further embodiment, the prior value is also displayed along with the new value of 0.1 V, for example for comparing the new value with the prior value.

A second change CHANGE2 is applied on printer 122 on date-time 01.04.2014-11:30:00 with respect to a system setting TRP1 which is a trapping parameter. Trapping is a term most commonly used in the printing industry to describe a compensation for misregistration between printing units on a multicolor press. This misregistration causes unsightly gaps or white-space on final printed work. Trapping involves creating overlaps (spreads) or underlaps (chokes) of objects during the print production process to eliminate misregistration on the press. Using wrong trapping settings can make the problem worse by creating dark lines on the edges.

According to an embodiment of a printer instance of the print fleet system according to the invention, the printer instance has system settings being trapping presets with trapping parameters on a system-level. Per print job, the use can select via a user interface screen such as a LUI which preset is desired to be used when printing the print job.

A value of the trapping parameter TRP1 is changed into 2.1 pt, wherein pt is a trapping unit in pixel points.

The changes CHANGE1 and CHANGE2 will lead to the generation of three advices.

The three advices apply to the three bold rows in storage content 200.

A first advice is generated for printing print job JOB2 on MEDIA2 on printer 121, since the change CHANGE2 was applied to printer 122 on print job JOB2 using MEDIA2 at a date-time 01.04.2014-11:30:00 before the planned printing of print job JOB2 using MEDIA2 on printer 121 having a date-time 01.04.2014-12:30:00. The advice may be to change a value of system setting TRP1 into the value 2.1 pt trapping units as done during CHANGE2. Another advice may be to first establish an appropriate value for this system setting TRP1 on the printer 121. Since printers 121 and 122 are of the same machine type, the system setting TRP1 for printer 121 and the system setting TRP1 for printer 122 may correspond to each other.

A second advice is generated for printing print job JOB1 on MEDIA1 on printer 122, since the change CHANGE1 was applied to printer 121 on print job JOB1 using MEDIA1 having a date-time 02.04.2014-10:00:10 before the planned printing of print job JOB1 using MEDIA1 on printer 122 at date-time 02.04.2014-11:00:00. The advice may be to change a value of system setting STV2 into the value 0.1 V as done during CHANGE1. Another advice may be to first establish an appropriate value for this system setting STB2 on the printer 122. Since printers 121 and 122 are of the same machine type, the system setting STV2 for printer 121 and the system setting STV2 for printer 122 may correspond to each other.

In a first instance, a third advice is generated for printing print job JOB2 on MEDIA2 on printer 14, since the change CHANGE2 was applied to printer 122 on print job JOB2 using MEDIA2 having a date-time 01.04.2014-12:00:00 before the planned printing of print job JOB2 using MEDIA2 on printer 14 at date-time 03.04.2014-16:00:00. The advice may be to change a value of system setting TRP1 into the value 2.1 pt trapping units as done during CHANGE2. Another advice may be to first establish an appropriate value for this system setting TRP1 on the printer 14. Since printers 122 and 14 are not of the same machine type the system setting TRP1 for printer 121 may not have an equivalent system setting TRP1 for printer 14. In the latter case, the advice may not be issued in a second instance.

Figure 3:
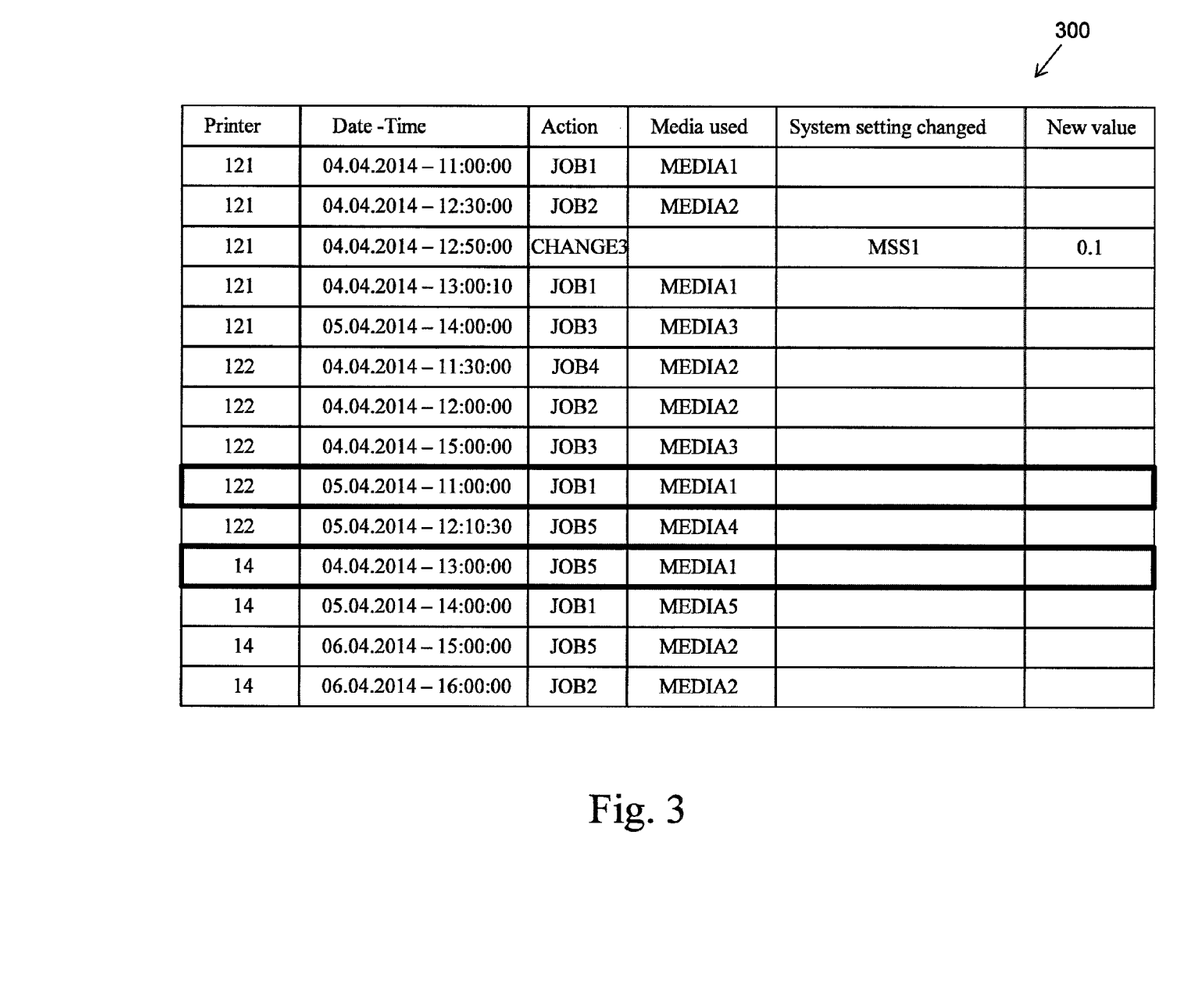

FIG. 3 shows schematically storage content 300 of the registration system according to the invention. The storage content 300 comprises the same number of columns as in the storage content 200 of FIG. 2.

In this example, print jobs are registered and a change of one kind of system setting take place.

A change CHANGE3 is applied on printer 121 on date-time 01.04.2014-12:50:00 with respect to a media system setting MSS1, for example an image shift setting in millimeters, which is a system setting on behalf of the media MEDIA1 which is the media used by the next job JOB1. In this example, a value of the media system setting MSS1 is changed into +0.1 mm.

The change CHANGE3 will lead to the generation of two advices for print jobs which use the same media MEDIA1.

The two advices apply to the two bold rows in storage content 300.

A first advice is generated for printing print job JOB1 on MEDIA1 on printer 122, since the change CHANGE3 was applied to printer 121 on print job JOB1 using MEDIA1 having a date-time 04.04.2014-12:50:00 before the planned printing of print job JOB1 using MEDIA1 on printer 122 at date-time 05.04.2014-11:00:00. The advice may be to change a value of media system setting MSS1 into the value +0.1 mm as done during CHANGE3. Another advice may be to first establish an appropriate value for this media system setting MSS1 on the printer 122. Since printers 121 and 122 are of the same machine type the media system setting MSS1 for printer 121 and the media system setting MSS1 for printer 122 correspond to each other and will have the same effect.

In a first instance, a second advice is generated for printing print job JOBS on MEDIA1 on printer 14, since the change CHANGE3 was applied to printer 121 on print job JOB1 using media MEDIA1 having a date-time 04.04.2014-12:50:00 before the planned printing of print job JOBS using the same media MEDIA1 on printer 14 at date-time 04.04.2014-13:00:00. The advice will be to change a value of media system setting MSS1 into the value 0.1 mm as done during CHANGE3. Another advice may be to first establish an appropriate value for this media system setting MSS1 on the printer 14. Since printers 122 and 14 are not of the same machine type the media system setting MSS1 for printer 121 may not have a corresponding media system setting MSS1 for printer 14. In the latter case, the advice may not be issued in a second instance.

A value change to a media system setting of the printer 121 may occur after a registration procedure X has been performed on printer 121 before production on a certain type of media. When intending to print on the same type of media by means of the printer 122, advice is generated. The advice is generated by the advice system looking at the data stored in the registration system.

Before printing on the type of media by means of printer 122, the advice may be displayed as a set of phrases: "You performed the registration procedure X before printing on media M on printer instance 121. Would you like to perform the registration procedure X on this printer instance 122 as well?"). The advice is accompanied by a confirmation button and a decline button for confirming, respectively declining the suggested action mentioned in the advice.

Another value change to a system setting of the printer 121 may occur after a media calibration Y has been performed on printer 121 before starting a certain print job JOBX. When intending to print the same print job JOBX by means of the printer 122, advice is generated. The advice is generated by the advice system looking at the data stored in the registration system. Print job JOBX may use different kind of media to be printed upon, but the other print job settings or the content of print job JOBX urge a value change of the appropriate system setting.

Before printing the print job JOBX by means of printer 122, the advice may be displayed as a set of phrases: "You performed the media calibration Y before printing print job JOBX on printer instance 121. Would you like to perform the media calibration Y on this printer instance 122 as well?"). The advice is accompanied by a confirmation button and a decline button for confirming or, respectively declining the suggested action mentioned in the advice.

As can be distilled from the mentioned changes, a value change of a system setting may be applied in a first case (not shown) before the same print job is printed, i.e. the first print job is equal to the second print job with respect to the content to be printed, or in a second case before a second print job is started which uses the same media as the first print job, or in a third case which is a combination of the first case and the second case. Other cases may be envisioned wherein a value of an arbitrary print job setting of the first print job equals a value of a same print job setting of the second print job. Storage content 200 as shown in FIG. 2 shows registered value changes of the third case and bold rows for which a generated advice for the third case is applicable. Storage content 300 as shown in FIG. 3 shows a registered value change of the second case and bold rows for which a generated advice for the second case is applicable. In the same way, value changes of the second case and value changes of the other cases may be registered in the storage of the registration system.

Figure 4:
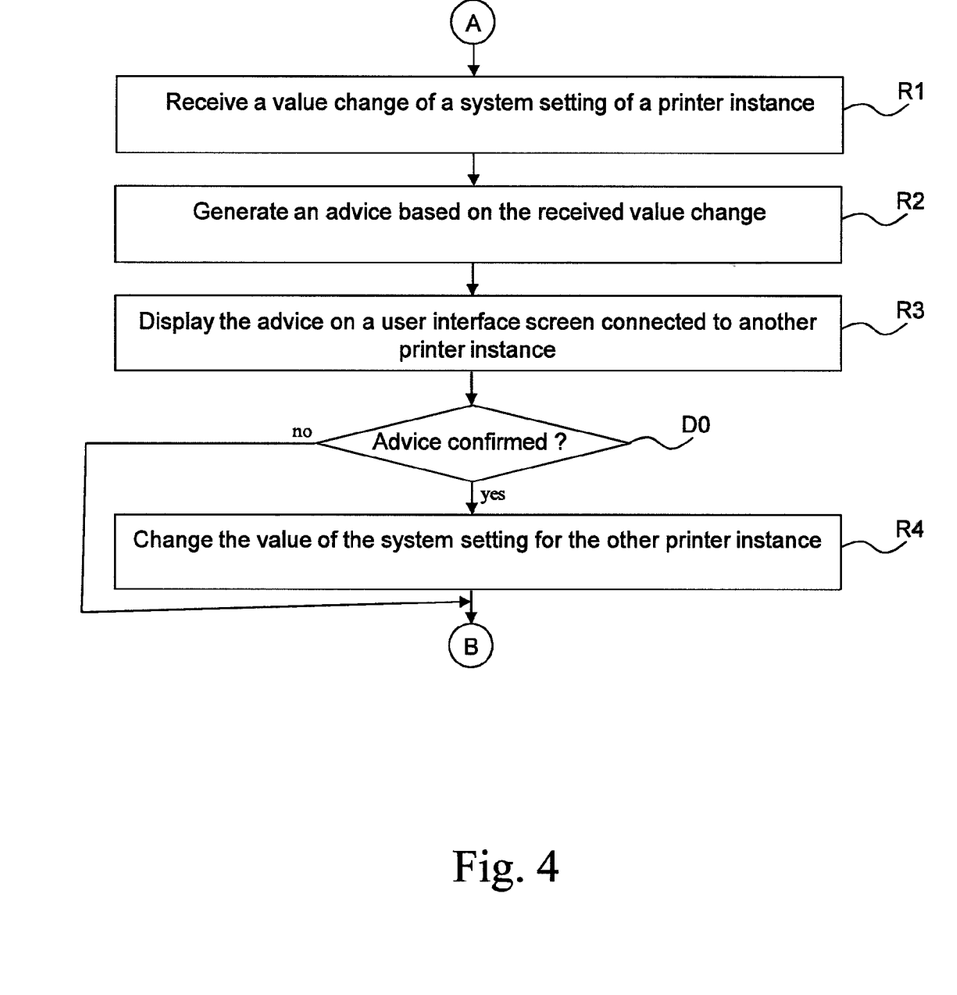
FIGS. 4-6 are flow diagrams of the method according to the invention.
Figure 5:
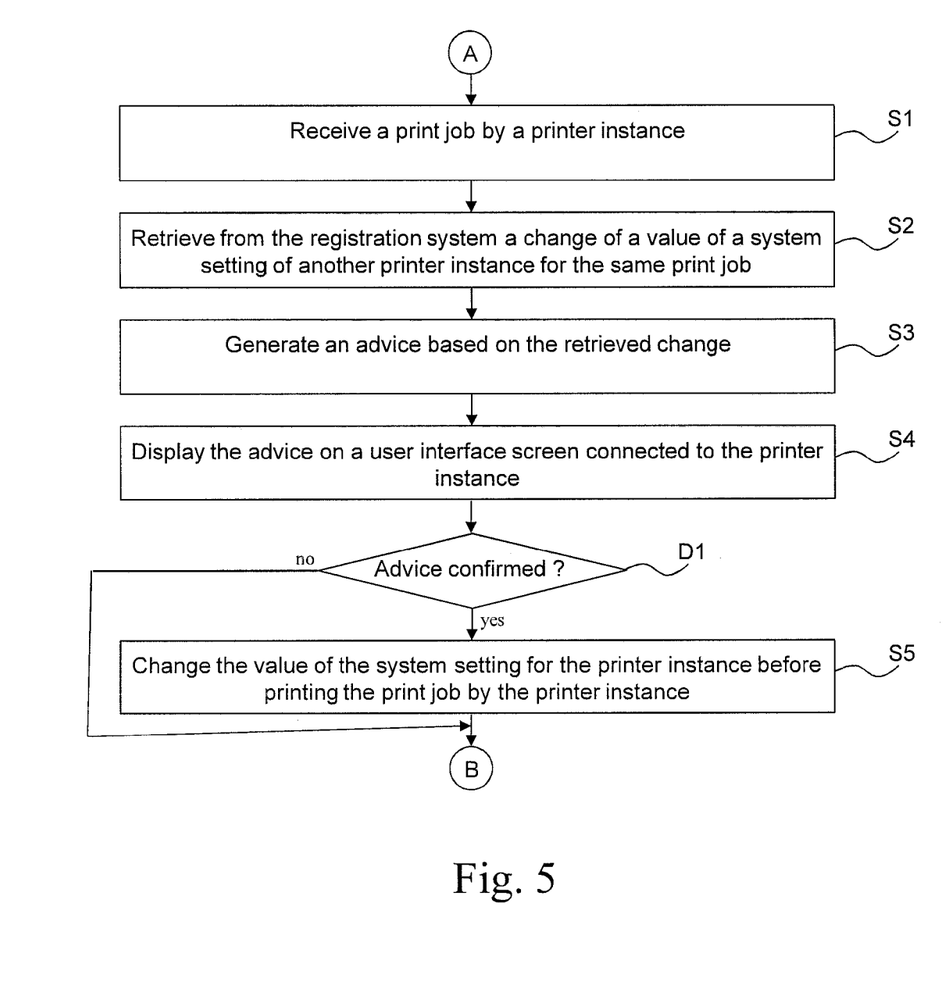
Figure 6:
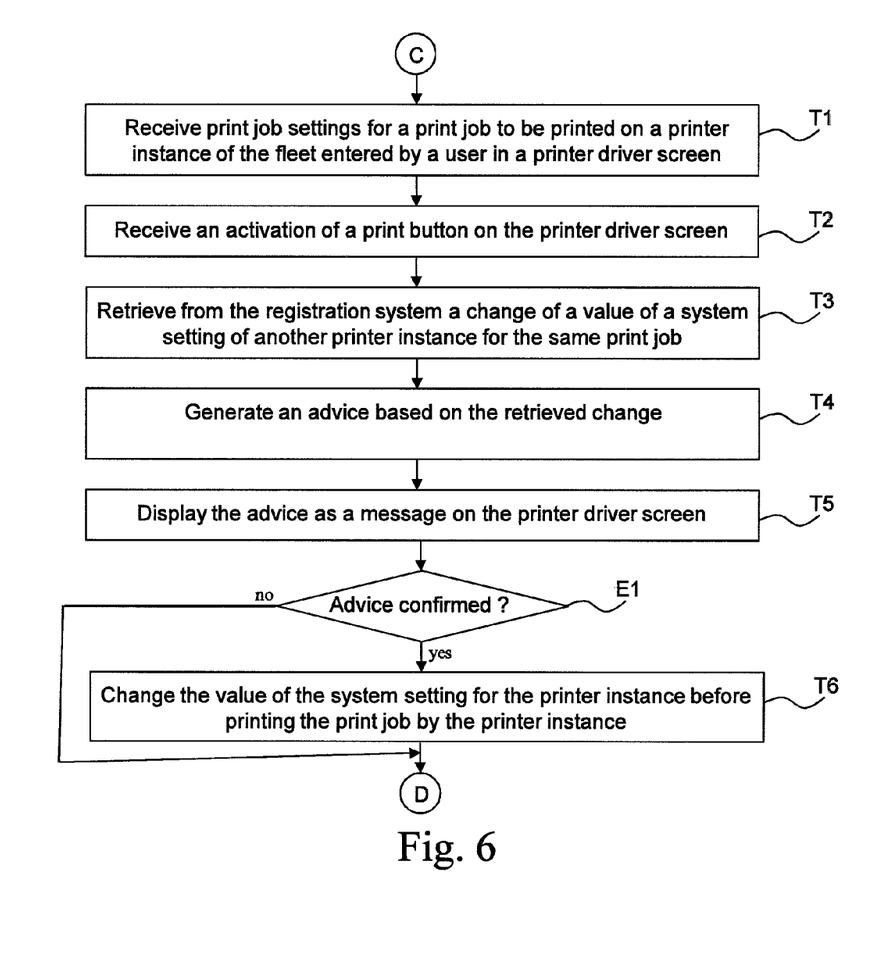

FIGS. 4-6 are flow diagrams of embodiments of the method according to the invention. The method is used for the print fleet system according to the invention comprising a plurality of printer instances and a user interface screen.

A first embodiment of the method is explained in FIG. 4. A starting point A in FIG. 4 leads to a first step R1.

In the first step R1, a value change of a system setting of a printer instance of the plurality is received by the registration system, the system setting comprised in the set of at least one system setting according to the invention. The registration system may be implemented as a software application on a gathering control unit of the print fleet system, for example a control unit of one of the printer instances of the print fleet system or a remote work station connected to the network of the print fleet system or a mobile device wirelessly connected to the network of the print fleet system.

In a second step R2, advice is generated based on the received value change. The changed system setting on the other printer instance is also a system setting on the printer instance on which the system setting is initially changed. The advice requests the user if he wants the same value change to be applied to the system setting of another printer instance. The advice is generated by an advice system. The advice system may be implemented as a software application on a gathering control unit of the print fleet system, for example a control unit of one of the printer instances of the print fleet system or a remote work station connected to the network of the print fleet system or a mobile device wirelessly connected to the network of the print fleet system. If the printer instance is not capable of changing the system setting to the advised value, the advice may change the value of the system setting into another suitable value for the other printer.

In a third step R3, the advice is displayed on a user interface screen connected to the printer instance. The user interface screen may be the local user interface at the printer instance or a remote user interface screen on a work station connected to the network of the print fleet system or a user interface screen on a mobile device wirelessly connected to the network of the print fleet system.

In a first optional decision step D0, it is checked if the advice is confirmed by the user. Such a confirmation may be entered by the user by means of pressing an appropriate confirmation button available on the user interface screen. If the advice is confirmed, the method proceeds with a fourth step R4. If the advice is declined, the method ends in an end point B.

In the fourth step R4, the value of the system setting is changed into a new value for the other printer instance. The new value is equal to the value extracted from the change to the corresponding system setting in the printer instance which is registered by the registration system according to the invention. The fourth step R4 may be preceded by an optional step of determining the optimal value of the system setting for the printer instance. This determination, for example by proof prints, may reveal another value than the advised value.

The first decision step D0 and the fourth step R4 are optional since the user may be able to manually change the value of the system setting via a local user interface of the other printer instance.

The method ends in the end point B.

A second embodiment of the method is explained in FIG. 5. A starting point A in FIG. 5 leads to a first step S1.

In the first step S1, a print job is received by a printer instance of the print fleet system according to the invention. The print job may be submitted by a printer driver system to the printer instance.

In a second step S2, a change of a value of a system setting of another printer instance is retrieved from the registration system. The value change is applied to the other printer instance before the same print job was printed on the other printer instance in the past. The registration system may be implemented as a software application on a gathering control unit of the print fleet system, for example a control unit of one of the printer instances of the print fleet system or a remote work station connected to the network of the print fleet system or a mobile device wirelessly connected to the network of the print fleet system.

In a third step S3, advice is generated based on the retrieved change. The changed system setting on the other printer instance is also a system setting on the printer instance on which the print job is now intended to be printed. The advice requests the user if he wants the same change to be applied to the system setting of the printer instance at which the print job is going to be printed. The advice is generated by an advice system. The advice system may be implemented as a software application on a gathering control unit of the print fleet system, for example a control unit of one of the printer instances of the print fleet system or a remote work station connected to the network of the print fleet system or a mobile device wirelessly connected to the network of the print fleet system. If the printer instance is not capable of changing the system setting to the advised value, the advice may be to print the print job on another printer.

In a fourth step S4, the advice is displayed on a user interface screen connected to the printer instance. The user interface screen may be the local user interface at the printer instance or a remote user interface screen on a work station connected to the network of the print fleet system or a user interface screen on a mobile device wirelessly connected to the network of the print fleet system.

In a first decision step D1, it is checked if the advice is confirmed by the user. Such a confirmation may be entered by the user by means of pressing an appropriate confirmation button available on the user interface screen. If the advice is confirmed, the method proceeds with a fifth step S5. If the advice is declined, the method ends in an end point B.

In the fifth step S5, the value of the system setting is changed into a new value for the printer instance before printing the print job by the printer instance. The new value is equal to the value extracted from the change to the corresponding system setting in the other printer instance for the same print job which is registered by the registration system according to the invention. In an optional step, the print job is printed on the printer instance. The fifth step S5 may be preceded by an optional step of determining the optimal value of the system setting for the printer instance. This determination, for example by proof prints, may reveal another value than the advised value.

The first decision step D1 and the fifth step S5 are optional since the user may be able to manually change the value of the system setting via a local user interface of the other printer instance.

The method ends in the end point B.

A third embodiment of the method is explained in FIG. 6. A starting point C in FIG. 6 leads to a first step T1.

In the first step T1, print job settings for a print job are received in a printer driver screen by means of user input. The print job is intended to be printed by a printer instance of the print fleet system according to the invention. The printer driver screen also comprises a print button to invoke printing of the print job by the printer instance and a cancel button to cancel the print job. The printer driver screen is part of a work station of the user which is connected to the printer instances of the print fleet system via the network according to the invention.

In a second step T2, an activation of a print button on the printer driver screen is received. The user may press the print button in order to start printing of the print job on the printer instance.

In a third step T3, a change of a value of a system setting of another printer instance is retrieved from the registration system. The change is applied to the other printer instance before the same print job was printed on the other printer instance in the past. The registration system may be implemented as a software application on a gathering control unit of the print fleet system, for example a control unit of one of the printer instances of the print fleet system or a remote work station connected to the network of the print fleet system or a mobile device wirelessly connected to the network of the print fleet system.

In a fourth step T4, advice is generated based on the retrieved change. The changed system setting on the other printer instance is also a system setting on the printer instance on which the print job is now intended to be printed. The advice requests the user if he wants the same change to be applied to the system setting of the printer instance at which the print job is going to be printed. The advice is generated by an advice system. The advice system may be implemented as a software application on a gathering control unit of the print fleet system, for example a control unit of one of the printer instances of the print fleet system or a remote work station connected to the network of the print fleet system or a mobile device wirelessly connected to the network of the print fleet system.

In a fifth step T5, the advice is displayed as a message on a printer driver screen. This may be a pop up message with a confirmation button and a decline button.

In a first decision step E1, it is checked if the advice is confirmed by the user. Such a confirmation may be registered by the user pressing the appropriate confirmation button available on the printer driver screen. If the advice is confirmed, the method proceeds with a sixth step T6. If the advice is declined, the method ends in an end point D.

In the sixth step T6, the value of the system setting is changed into a new value for the printer instance before printing the print job by the printer instance. The new value is equal to the value extracted from the change to the corresponding system setting in the other printer instance for the same print job which is registered by the registration system according to the invention. In a last step, the print job is sent to the printer instance to be printed on the printer instance. The sixth step T6 may be preceded by an optional step of determining the optimal value of the system setting for the printer instance. This determination, for example by proof prints, may reveal another value than the advised value.

The first decision step E1 and the sixth step T6 are optional since the user may be able to manually change the value of the system setting via a local user interface of the other printer instance.

The method ends in the end point D.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A print fleet system, comprising:
a plurality of printer instances, each of the plurality of printer instances having a same set of at least one system setting;
a computer system configured to:
register value changes made to at least one value of the at least one system setting of the set of at least one system setting, and
generate advice for an operator; and
a user interface system configured to display the advice,
wherein the computer system comprises an entry for each value change made to the same set of the at least one system setting of a printer instance out of the plurality of printer instances,
wherein the computer system is configured to generate advice on another printer instance out of the plurality of printer instances, the advice concerning the value change comprised in the computer system,
wherein the computer system is configured to transmit signals representing the advice to the user interface screen for display in order to advise the operator,
wherein the entry in the computer system comprises a first print job intended to be printed on the printer instance on behalf of which first job a value change has been made,
wherein the computer system is configured to generate advice related to a second print job intended to be printed on the other printer instance out of the plurality of printer instances, the advice concerning the value change comprised in the computer system, and the value change being relevant for printing of the second print job, and
wherein the computer system is configured to transmit signals representing the advice to the user interface screen for display in order to advise the operator before printing the second print job on the other printer instance.

2. The print fleet system according to claim 1, wherein the computer system is part of a shared catalog system of jobs and media used in the jobs, the shared catalog system storing the value changes made to the at least one value of the at least one system setting of the set of at least one system setting.

3. The print fleet system according to claim 1, wherein the user interface system is part of a printer driver system for the print fleet system and the computer system is configured to transmit the signals representing the advice when the user selects the other printer instance on the printer driver system for printing the second print job.

4. The print fleet system according to claim 2, wherein the media to be used for the first print job is equal to the media to be used for the second print job.

5. The print fleet system according to claim 4, wherein the second print job equals the first print job.

6. A method for generating advice for a printer instance out of a plurality of printer instances, each of the plurality of printer instances having a same set of at least one system setting, the method comprising the steps of
receiving a value change of a system setting of a printer instance of the plurality of printer instances by a registration system, the system setting being comprised in the same set of the at least one system setting;
generating advice based on the received value change;
displaying the advice on a user interface screen of another printer instance of the plurality of printer instances;

registering a first print job by the registration system of behalf of which first print job the value change has been made to the printer instance;

upon printing a second print job on the other printer instance, for which second print job the value change is relevant, retrieving the value change of at least one system setting out of the set of at least one system setting from the registration system;

generating the advice based on the value change relevant for printing the second print job; and displaying the advice on a user interface screen of the printer instance before printing the second print job on the other printer instance.

7. The method according to claim 6, further comprising the steps of:

submitting the second print job by means of a printer driver system;

receiving a selection of the printer instance by means of a printer driver system; and upon the receipt of the selection, performing the steps of retrieving the value change, generating the advice based on the value change, and displaying the advice.

8. The method according to claim 6, wherein media to be used for the first print job is equal to media to be used for the second print job.

9. The method according to claim 8, wherein the second print job equals the first print job.

10. The method according to claim 6, further comprising the steps of:

receiving a confirmation of the advice; and changing the at least one system setting on the other printer instance.

11. The method according to claim 6, further comprising the steps of:

receiving a confirmation of the advice; and changing the at least one system setting on the printer instance before printing the second print job by the other printer instance.

12. A non-transitory computer readable medium comprising computer executable program code configured to instruct a computer to perform the method according to claim 6.

* * * * *